(12) United States Patent
Chen et al.

(10) Patent No.: US 9,355,095 B2
(45) Date of Patent: May 31, 2016

(54) CLICK NOISE CHARACTERIZATION MODEL

(75) Inventors: Weizhu Chen, Beijing (CN); Zheng Chen, Beijing (CN); Adish Singla, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 443 days.

(21) Appl. No.: 13/341,653

(22) Filed: Dec. 30, 2011

(65) Prior Publication Data

US 2013/0173571 A1 Jul. 4, 2013

(51) Int. Cl.
*G06F 17/30* (2006.01)

(52) U.S. Cl.
CPC .......... *G06F 17/30* (2013.01); *G06F 17/30864* (2013.01); *G06F 17/3053* (2013.01); *G06F 17/30424* (2013.01); *G06F 17/30634* (2013.01); *G06F 17/30657* (2013.01)

(58) Field of Classification Search
CPC ............. G06F 17/30554; G06F 17/30424; G06F 17/30991; G06F 3/0482; G06F 17/30864; G06F 17/3053; G06F 17/30536; G06F 17/30448; G06F 17/30634; G06F 17/30657
USPC ............................................. 707/706
See application file for complete search history.

(56) References Cited

U.S. PATENT DOCUMENTS

| | | | |
|---|---|---|---|
| 7,647,314 B2* | 1/2010 | Sun .................. G06F 17/30864 | 706/12 |
| 7,877,385 B2* | 1/2011 | Craswell et al. ............... 707/726 |
| 8,041,710 B2* | 10/2011 | He .................... G06F 17/30867 | 707/722 |
| 8,103,667 B2* | 1/2012 | Azar ................. G06F 17/30731 | 707/732 |
| 8,359,309 B1* | 1/2013 | Provine et al. ................ 707/721 |
| 8,396,865 B1* | 3/2013 | Ie et al. ......... 707/723 |
| 8,412,727 B1* | 4/2013 | Das et al. ...................... 707/767 |
| 2005/0071465 A1* | 3/2005 | Zeng et al. ..................... 709/224 |
| 2007/0005588 A1* | 1/2007 | Zhang et al. ..................... 707/5 |
| 2007/0073579 A1* | 3/2007 | Immorlica .......... G06Q 30/0267 | 705/14.47 |
| 2007/0208730 A1 | 9/2007 | Agichtein et al. |
| 2007/0255689 A1* | 11/2007 | Sun .................... G06F 17/30864 |
| 2009/0037402 A1* | 2/2009 | Jones et al. ....................... 707/5 |
| 2009/0037410 A1* | 2/2009 | Jones ................. G06F 17/30864 |
| 2009/0106221 A1* | 4/2009 | Meyerzon ......... G06F 17/30864 |
| 2009/0144614 A1* | 6/2009 | Dresevic .............. G06F 17/2205 | 715/239 |
| 2009/0228353 A1* | 9/2009 | Achan et al. ..................... 705/14 |
| 2009/0265290 A1* | 10/2009 | Ciaramita et al. .............. 706/12 |
| 2009/0313286 A1* | 12/2009 | Mishra et al. .................. 707/102 |
| 2010/0023508 A1* | 1/2010 | Zeng et al. ......................... 707/5 |
| 2010/0082421 A1* | 4/2010 | Tuladhar et al. ........... 705/14.41 |
| 2010/0125570 A1* | 5/2010 | Chapelle ........... G06F 17/30864 | 707/722 |
| 2010/0138410 A1* | 6/2010 | Liu .................... G06F 17/30864 | 707/723 |

(Continued)

OTHER PUBLICATIONS

Dupret, et al., "A Model to Estimate Intrinsic Document Relevance from the Clickthrough Logs of a Web Search Engine", In Proceedings of the third ACM International Conference on Web Search and Data Mining, Feb. 4-6, 2010, pp. 181-190.

(Continued)

*Primary Examiner* — Thanh-Ha Dang
(74) *Attorney, Agent, or Firm* — Sandy Swain; Micky Minhas; Lee & Haynes, PLLC (57) ABSTRACT

The techniques discussed herein consider a degree of noise associated with user clicks performed during search sessions. The techniques then generate a model that characterizes click noise so that search engines can more accurately infer document relevance.

20 Claims, 5 Drawing Sheets

(56) References Cited

U.S. PATENT DOCUMENTS

| 2010/0306213 | A1* | 12/2010 | Taylor | G06F 17/30867 |
| | | | | 707/759 |
| 2011/0029517 | A1* | 2/2011 | Ji et al. | 707/734 |
| 2011/0191316 | A1* | 8/2011 | Lai et al. | 707/706 |
| 2012/0259919 | A1* | 10/2012 | Yan | G06Q 30/02 |
| | | | | 709/204 |

OTHER PUBLICATIONS

Piwowarski, et al., "Mining User Web Search Activity with Layered Bayesian Networks or How to Capture a Click in its Context", In Proceedings of the Second ACM International Conference on Web Search and Data Mining, 2009, pp. 162-171.

Agichtein, et al., "Learning User Interaction Models for Predicting Web Search Result Preferences", In Proceedings of the 29th Annual International ACM SIGIR Conference on Research and Development in Information Retrieval, Aug. 6-11, 2006, pp. 3-10.

Dupret, et al., "Web Search Engine Evaluation Using Clickthrough Data and a User Model", In Proceedings of the International World Wide Web Conference, May 8-12, 2007, 4 pages.

Dou, et al., "Are Click-through Data Adequate for Learning Web Search Rankings?", In Proceeding of the 17th ACM Conference on Information and Knowledge Management, Oct. 26-30, 2008, pp. 73-82.

Radlinski, Filip, "Addressing Malicious Noise in Clickthrough Data", Retrieved on: Sep. 1, 2011, Available at: http://radlinski.org/papers/Radlinski07ClickSpam.pdf.

* cited by examiner

CLICK NOISE CHARACTERIZATION MODEL

BACKGROUND

Inferring a document's relevance is an important factor when a search engine provides search results in response to a user submitted search query. Typically, search engines find and rank a plurality of online documents based on a document's inferred relevance to the submitted search query. After receiving a search query and identifying documents associated with the query, the search engines then display the most relevant documents near the top of a list of the identified documents.

Accordingly, it is important for search engines to accurately infer document relevance so that a user is presented with a list of online documents that are relevant to a submitted search query.

SUMMARY

The techniques described herein include rating search sessions maintained in click through data logs as relevant or irrelevant. Using the rated search sessions, the techniques extract feature data and determine feature values. The techniques then build a Noise-Aware Click Model that characterizes a degree of noise associated with user clicks. The Noise-Aware Click Model can then be used to infer document relevance for search sessions which have not been rated. Accordingly, the Noise-Aware Click Model allows a search engine to predict user click events based on inferred relevance, and improve search results provided to a user.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Overview

The following description sets forth techniques for considering a degree of noise associated with user clicks performed during search sessions. The techniques discussed herein generate a model that characterizes click noise so that search engines can more accurately infer document relevance.

In order to infer document relevance, search engines store and maintain click through data logs (CTDLs). CTDLs include information corresponding to a user's clicking behavior responsive to a search query provided to a search engine. CTDLs typically store and maintain the specific search query provided (i.e. the words) to the search engine, the results the search engine provides responsive to the search query (e.g., hyperlinks or Uniform Resource Locators (URLs) referencing online documents including but not limited to HTML pages, XML pages, text documents, PDF documents, online images, etc.), and information relating to which document links, if any, the user clicks (e.g., click selection with a computer mouse, voice selection, touch screen selection), subsequent to viewing the results. Common search engines may include, but are not limited to, Bing®, Google®, etc.

Figure 1:
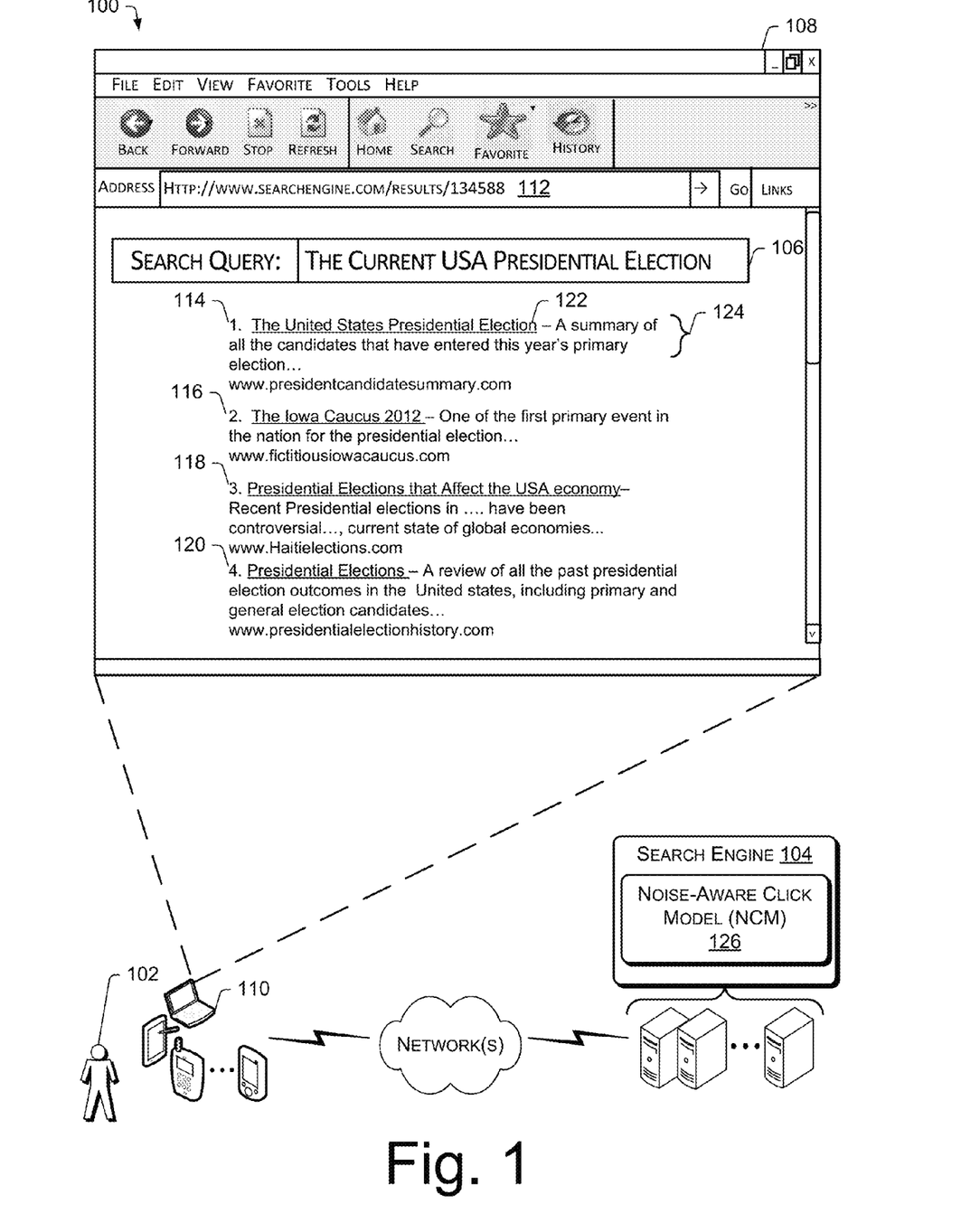
FIG. 1 illustrates an example Search Engine Results Page, in accordance with various embodiments described herein.

FIG. 1 illustrates an environment 100 where a user 102 provides a search query, "The Current USA Presidential Election", over a network connection to a search engine 104 via use of a query window 106 on an interface 108 of a computer 110 (e.g., via a browser or other client-side application). The search query includes one or more keywords identifying a topic of interest to the user 102. In response to submitting the search query, the search engine 104 provides a Search Engine Result Page (SERP) 112 via the interface 108. As previously discussed, the SERP 112 typically lists the most relevant documents near the top of the web page on the interface 108. The search engine 104 determines the order of listed documents based at least partly on document relevance. For instance, the search engine 104 providing the SERP 112 in FIG. 1 determines that the online document listed as "The United States Presidential Election" at the first position 114, is most relevant to the search query "The Current USA Presidential Election". Moreover, the search engine 104 determines that the online documents at the second 116, third 118, and fourth 120 listed positions, are the next most relevant documents (e.g., in the listed order). While FIG. 1 only displays four document links, it is understood in the context of this document, that search engines may list more document links (e.g., six, eight, ten, fifteen, twenty, etc.) based on the amount of available display space, the size of the font, the size of the interface, a setting associated with an amount of text to display, etc.

When inferring document relevance, a search engine 104 employs click models so that search results can be ranked according to inferred relevance and listed on a SERP. Conventional click models typically consider user click behavior as an easily observable binary event, analyzing whether the user clicks on a document link displayed on the SERP or skips the document link (e.g., does not click on the document link). However, conventional click models neglect a context in which a user click occurs (e.g., click selection with a computer mouse, voice selection, touch screen selection). For example, whether a user clicks a document or not is not always a reliable indication of a document's relevance. In one scenario, a user's interest in a document may be based on an examination of the words recited in a displayed hyperlink, such as "The United States Presidential Election" 122 in FIG. 1. In another scenario, a user's interest may result from examining a displayed snippet (i.e., one or more brief selective portions of the document) on the results page 124 in FIG. 1. In both scenarios, the user 102 may perceive that the document is relevant based on the information displayed on the SERP 112 and subsequently click on the document link. Then, upon further analysis of the complete document, the user may determine that the document is irrelevant, or does not include any intrinsic relevant information that the user 102 is interested. For example, the user 102 in FIG. 1 may examine and click on document link three at the third position 118 perceiving that the document is relevant to "The Current USA Presidential Election". Upon further examination of the complete document, the user realizes that the document does not discuss "The Current USA Presidential Election", but rather is directed to presidential elections in other countries that affect the economy in the United States. Accordingly, although the search engine 104 infers, based on the user click, that the document corresponding to the link at position three 118 is a relevant document, the document is in fact not relevant to the submitted search query. In another example, the user 102 may simply have a habit of clicking on a random or particular document link (e.g., the first listed document link because it is always on top) without examining the text in the hyperlink, the URL, or the displayed snippet.

Thus, conventional click models do not qualify user click data beyond the mere binary event of whether or not the click of a document link occurs. Accordingly, the binary event that occurs for each document link displayed in a SERP may be a false indication of relevance and therefore, the binary event data is not a reliable indicator of relevance.

The techniques discussed herein provide a Noise-Aware Click Model (NCM) 126 that the search engine 104 uses to differentiate user click data. The NCM 126 enables differentiation of the user click data by considering the context in which a user makes a click decision. The context in which a user makes a click decision provides information that characterizes noise and user perceptions associated with a click event. The noise associated with a click event results from user habits, user preferences, and/or user behavior that can be observed from CTDLs. Thus, search engines use the NCM 126 to determine whether a user click is a quality user click for inferring relevance of a document.

For purposes of this document, a query session contains user actions (e.g., document clicks and document skips) that occur responsive to a single search query, such as "The Current USA Presidential Election" in FIG. 1. A search session includes all the actions undertaken by the user to perform a search task. For example, if the user 102 in FIG. 1 is not provided with sufficient results responsive to the initial search query, then the user 102 may perform another search query that is a reformulation of the previous search query (e.g., adding words, subtracting words, or modifying words). Thus, a search session may comprise multiple query sessions each including i) a search query directed to the same or similar topic of interest, and ii) user clicks responsive to the respective search queries.

Figure 2:
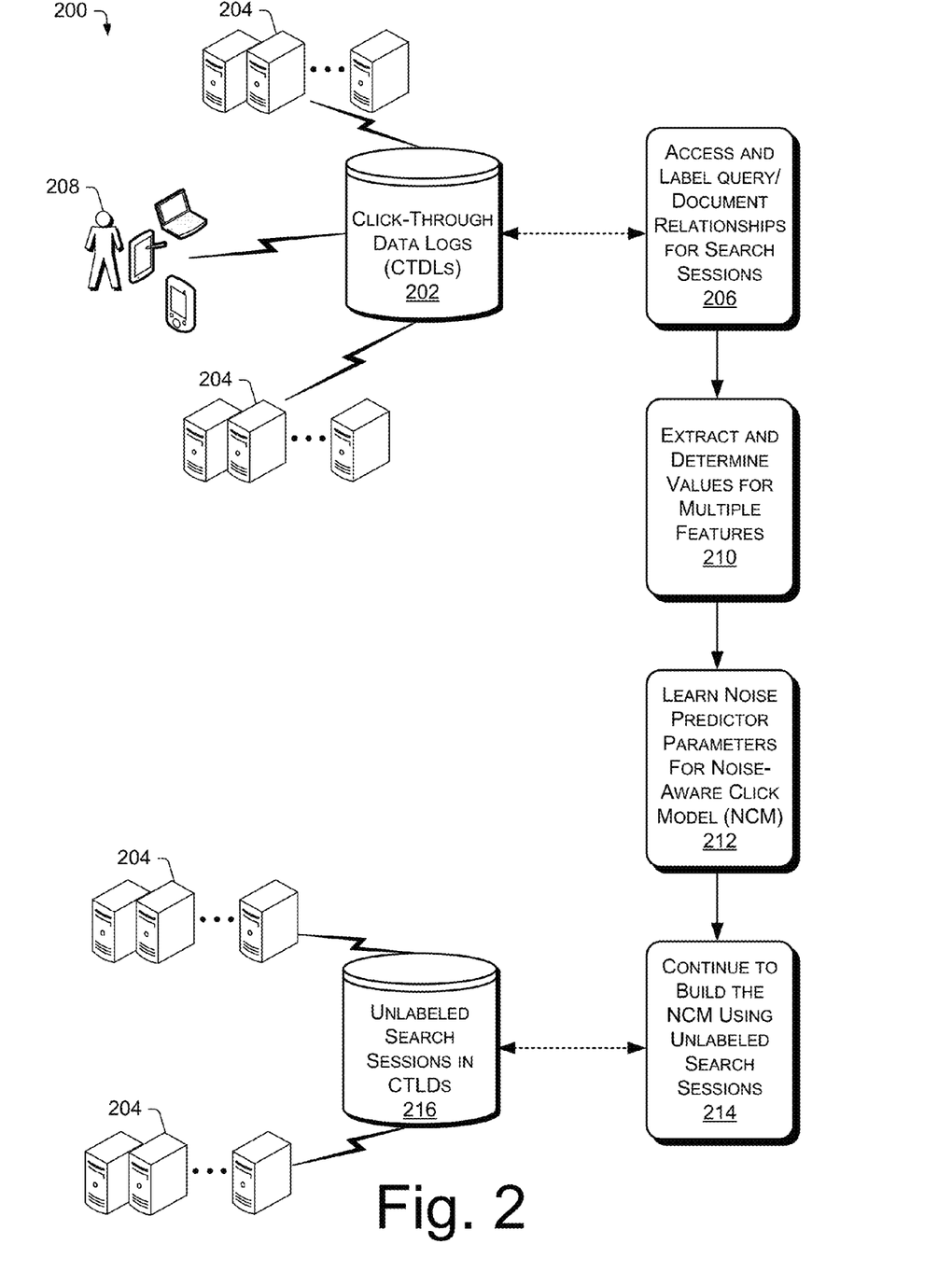
FIG. 2 illustrates an example Noise-Aware Click Model training environment, in accordance with various embodiments described herein.

FIG. 2 illustrates an example diagram 200 that describes a training environment that builds the NCM. As depicted in FIG. 2, search engines may maintain CTDLs 202 corresponding to billions of different search sessions and query sessions. In various embodiments, the CTDLs 202 are stored in multiple farm clusters 204 at different geographical locations. A farm cluster may include thousands of machines (e.g., servers, storage devices, etc.) that maintain the CTDLs and perform computations that rank online documents based on relevance to a search topic.

At 206, one or more human judges 208 access a subset of the CTDLs 202 and label a set of representative user search sessions and query sessions. The labeling provides a human rating denoting an actual relevance between a search query and each of its corresponding documents listed on the SERP. This human labeling is defined as a query-document pair relevance rating. For example, once the search query and user click actions corresponding to the example in FIG. 1 are stored in the CTDLs 202, the one or more human judges 208 will note the search query "The Current USA Presidential Election," examine and analyze each of the documents displayed on the SERP, and label whether each of the documents at position one through four (114, 116, 118, and 120) is "relevant" or "irrelevant" to the search query. In some instances, this rating corresponds to an analysis of the complete document and not just to the displayed snippet 124 provided via the SERP.

At 210, the techniques discussed herein extract features from the human judged search sessions that relate to user click behavior, and determine values for each of multiple different features. The extracted features help describe the context in which a user click occurs and, therefore, the extracted features provide a good indication of noise associated with a user click. At 212, the techniques learn noise predictor parameters for the NCM based on the extracted features and the human provided relevance ratings. At 214, the techniques continue to build the NCM using features extracted from search sessions in the CTDLs 216 that have not been labeled by human judges.

Thus, by employing the training environment in FIG. 2, a search engine is able to generate a NCM that considers noise associated with user click events and takes into account user perceptions when inferring document relevance. The search engine then employs the NCM to better predict user click events and improve search results for a search topic by re-ranking document links based on the inferred relevance. Furthermore, the NCM may provide an equivalent to human judges, by providing a relevance rating that considers noise associated with a click event. Human judging, which reveals actual relevance, is not practical due to costs and time associated with labeling all the search sessions in the CTDLs. Thus, the techniques described herein generalize a limited set of human judged search sessions to understand the degree of noise associated with each click, learn noise predictor parameters for the NCM, and use the NCM to infer document relevance for unlabeled search sessions.

Illustrative Architecture

Figure 3:
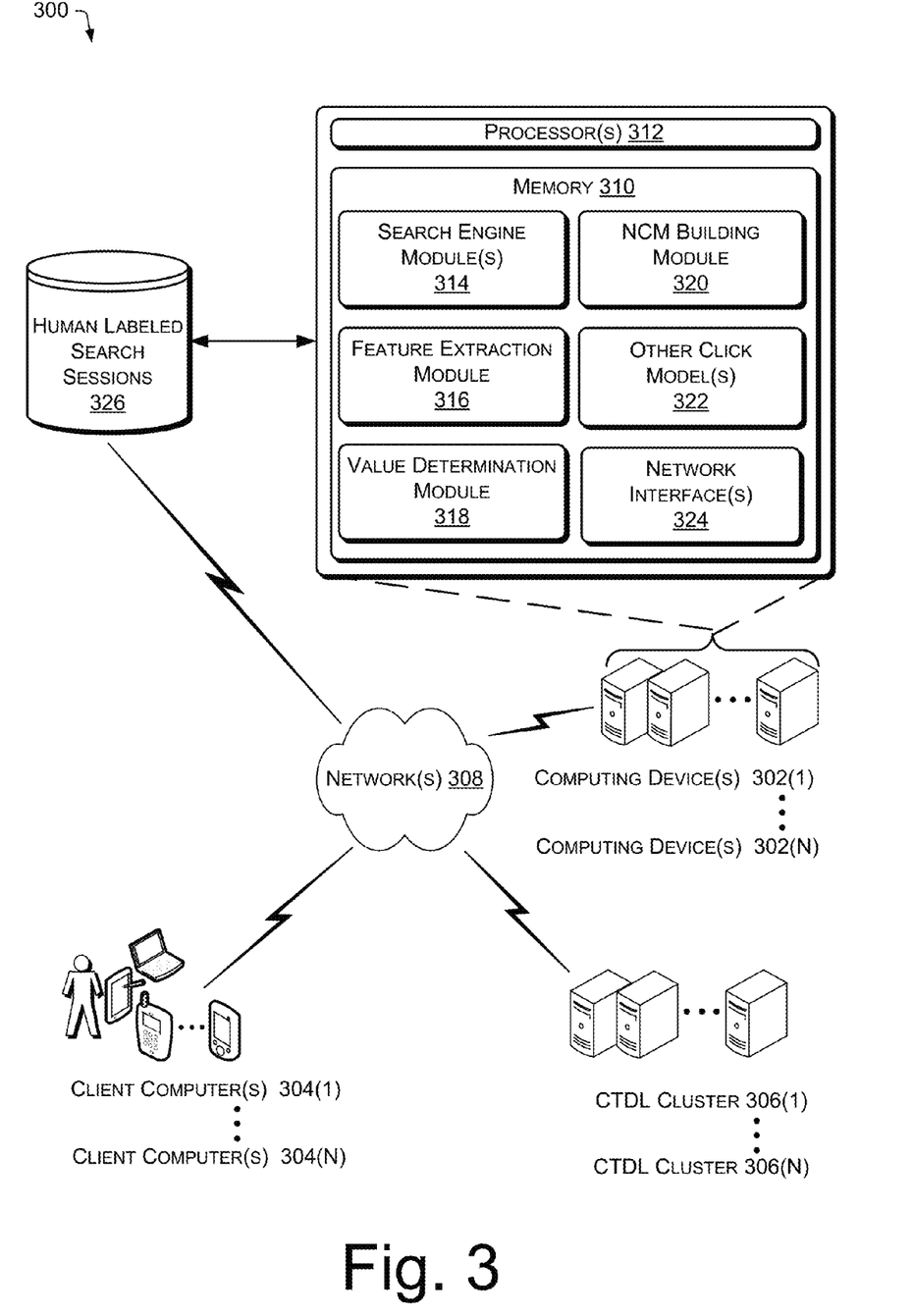
FIG. 3 illustrates an example architecture for implementing the described techniques, in accordance with various embodiments.

FIG. 3 shows an illustrative architecture 300 that may employ the described techniques. To this end, architecture 300 includes one or more computing devices 302(1) ... 302(N), one or more client computing devices 304(1) ... 304(N), and one or more CTDL clusters 306(1) ... 306(N), each coupled to network(s) 308. In various embodiments, the computing devices 302(1) ... 302(N) may be server computing devices hosting search functionality. In various embodiments, a user initiates search sessions and query sessions via a web browser or other application at the one or more client computing devices 304(1) ... 304(N). The client computing devices 304(1) ... 304(N) may comprise one of an array of computing devices capable of connecting to the one or more network(s) 308, such as a server computer, a client computer, a personal computer, a laptop computer, a mobile phone, a personal digital assistant (PDA), tablets, gaming consoles, set top boxes, and the like.

In various embodiments, the architecture 300 can be the World Wide Web, including numerous PCs, servers, and other computing devices spread throughout the world. The computing devices 302(1) ... 302(N), the client computing devices 304(1) ... 304(N), and the CTDL clusters devices 306(1) . . . 306(N) may be coupled to each other in various combinations through a wired and/or wireless network 308, including a LAN, WAN, or any other networking and/or communication technology known in the art.

The computing devices 302(1) . . . 302(N) comprise a memory 310 and one or more processors 312. Furthermore, in various embodiments, the computing devices 302(1) . . . 302(N) includes search engine module(s) 314, a feature extraction module 316, a feature value determination module 318, an NCM building module 320, other click models 322 used by the search engine module 314 to infer document relevance, and one or more network interface(s) 324, each of which are further discussed herein.

The processor(s) 312 may be a single processing unit or a number of units, all of which could include multiple computing units. The processor(s) 312 may be implemented as one or more microprocessors, microcomputers, microcontrollers, digital signal processors, central processing units, state machines, logic circuitries, and/or any devices that manipulate signals based on operational instructions. Among other capabilities, the processor(s) 312 may be configured to fetch and execute computer-readable instructions stored in the memory 310.

The memory 310 may comprise computer-readable media including, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing or server device.

In contrast, communication media may embody computer readable instructions, data structures, program modules, or other data in a modulated data signal, such as a carrier wave, or other transmission mechanism. As defined herein, computer storage media does not include communication media.

The network interface(s) 324 enable network communication, and may include one or more ports for connecting the respective computing device to the network 308. The network interface(s) 324 can facilitate communications within a wide variety of networks and protocol types, including wired networks (e.g. LAN, cable, etc.) and wireless networks (e.g., WLAN, cellular, satellite, etc.). For instance, the network interface(s) may access, over network(s) 308, data stored in the one or more CTDL clusters 306(1)...306(N) as discussed with respect to FIG. 2. In various embodiments, computing device(s) 302(1) . . . 302(N) may have local access to one or more CTDL clusters 306. Moreover, in various embodiments the modules stored in memory 310 may be coupled to, have direct access to, or have network access to the human labeled search sessions 326, as previously discussed with respect to FIG. 2.

It is understood in the context of this document, that the functionality performed by the search engine module 314, the feature extraction module 316, the feature value determination module 318, the NCM building module 320, and the other click models 322 may be all inclusive on a single computing device 302(1), or spread out amongst a plurality of computing device(s) 302(1) . . . 302(N) connected to one another via network(s) 308. In one example, functionality performed by the search engine module 314 may be spread across multiple computing devices. In another example, functionality performed by the search engine module 314 may be entirely on a first client computing device, while the NCM building module 320 may be on a different computing device.

As previously discussed, the context in which a user performs a click event and the history of user click behavior unique to a particular individual may provide an element of noise associated with a given user click. Accordingly, the techniques discussed herein characterize and understand this noise by extracting features associated with the context and user click behavior.

In various embodiments, the feature extraction module 316 extracts a set of feature data associated with each user click and/or each document-query pair for the human labeled search sessions 326, and also for unlabeled search sessions. As discussed herein, various individual features are dependent upon multiple different clicks within different query sessions and/or search sessions. Other individual features are dependent on the current click being processed and/or analyzed by the feature extraction module 316. The extracted feature data used to characterize and understand the noise associated with each user click includes user class features and context class features. User class features characterize the historical behaviors of the user during one or more query sessions. In one embodiment, the historical behaviors of a user are the historical search behaviors of the client computing device 304(1), regardless of the actual person performing the search. In these instances, the features are associated with a device identifier (ID) rather than a user ID. Examples of user class features include, but are not limited to, the features provided in Table 1.

TABLE 1

| User Class | |
|---|---|
| Feature Name | Feature Description |
| Dwell Time | The average dwell time for this user. |
| Interval Time | The average interval time between two clicks for this user. |
| User Skip | True if the user skips this document before. |
| User Click | True if the user clicks this document before. |
| User First Click | True if the user first clicks this document before. |
| User Last Click | True if the user last clicks this document before. |
| User Only Click | True if the user only clicks this document before. |
| Fraction Query No Click | Fraction of queries with no clicks for the user. |
| Fraction Query One Click | Fraction of queries with one click for the user. |
| Fraction Query Multi-Clicks | Fraction of queries with more than one click for the user. |

The "dwell time" feature is defined as the average amount of time that passes between two consecutive user actions (e.g., a query submission, a click event, exiting a web page, closing a browser window, etc.). For example, with respect to FIG. 1, the user may click on the document link at the first position 114, and spend two minutes examining the complete document before selecting a browser back button to view the SERP. Then the user may click on the document link at the third position 118 after examining the SERP for 10 seconds, and spend fifty seconds examining the complete document before altogether closing the browser window. Thus, the average dwell time for this sequence of actions is sixty seconds, or one minute. Here, the feature value determination module 318 receives the "dwell time" feature data from the feature extraction module 316, performs an averaging computation, and provides a time, in seconds, to the NCM building module 320 so that the NCM building module 320 can learn one or more noise predictor parameters.

The "interval time" feature is defined as the average time between two consecutive document link clicks for the user. For example, with respect to FIG. 1, the user 102 may click on the document link at the first position 114, examine the complete document for ten seconds, return to the original SERP via the browser "Back" functionality, and then click on the document link at the second position 116 five seconds later. This provides an "interval time" of fifteen seconds. Here, the feature value determination module 318 receives the "interval time" feature data from the feature extraction module 316, performs an averaging computation based on each calculated interval time, and provides a time, in seconds, to the NCM building module 320.

The "user skip" feature defines whether or not the user skipped the document link displayed on the SERP (i.e., did not click the current document link being analyzed). For example, with respect to FIG. 1, the user 102 may not have clicked on the document link at the third position 118 and thus, this feature would be true for that particular document. Here, the feature value determination module 318 receives the "user skip" feature data for each query-document from the feature extraction module 316, and provides a Boolean value, true or false, to the NCM building module 320.

The "user click" feature defines whether or not the user clicked the document link displayed on the SERP (e.g., the current document link being analyzed). For example, with respect to FIG. 1, the user 102 may have clicked on the document link at the first position 114 and thus, this feature would be true for that particular document. Here, the feature value determination module 318 receives the "user click" feature data for each query-document pair from the feature extraction module 316, and provides a Boolean value, true or false, to the NCM building module 320.

The "user first click" feature defines whether or not the current document was the first document link clicked by the user within a query session. For example, with respect to FIG. 1, if the user 102 first clicks on the document link at the first position 114, and then on the documents links at the second position 116 and fourth position 120, this feature would be true for the document corresponding to the user's first click, and false for the documents corresponding to clicks after the first click (i.e. within the same query session). Here, the feature value determination module 318 receives the "user first click" feature data for each query-document pair from the feature extraction module 316, and provides a Boolean value, true or false, to the NCM building module 320.

The "user last click" feature defines whether or not the current document was the last document link clicked by the user within a query session. For example, with respect to FIG. 1, if the user 102 first clicks on the document link at the first position 114, and then on the document link at the fourth position 120, this feature would be true for the document corresponding to the user's last click at the fourth position 120, and false for the document link at the first position 114. Here, the feature value determination module 318 receives the "user last click" feature data for each query-document pair from the feature extraction module 316, and provides a Boolean value, true or false, to the NCM building module 320.

The "user only click" feature defines whether or not the current document was the only document link clicked by the user within a query session. For example, with respect to FIG. 1, if the user 102 only clicks on the document link at the first position 114, and not on the document links at any of the other positions, then this feature would be true for the first listed document, and false for the second, third, and fourth listed documents. Here, the feature value determination module 318 receives the "user only click" feature data for each query-document pair from the feature extraction module 316, and provides a Boolean value, true or false, to the NCM building module 320.

The "fraction query no click" feature defines the percentage of query sessions in which the user does not click on any document links displayed on the SERP. For example, with respect to FIG. 1, if the user 102 performs the search query "The Current USA Presidential Election" and does not click on an of the displayed document links, and then performs a second search query "The Current USA Presidential Election 2012" and subsequently clicks on a displayed document link, then the percentage for "fraction query no click" would be one half or 50%. Here, the feature value determination module 318 receives the "fraction query no click" feature data from the feature extraction module 316, performs a percentage computation, and provides the percentage to the NCM building module 320.

The "fraction query one click" feature defines the percentage of query sessions in which the user clicks on only one document link displayed on the SERP. For example, with respect to FIG. 1, if the user 102 performs the search query "The Current USA Presidential Election" and clicks solely on the document at the first position 114, and then performs a second search query "The Current USA Presidential Election 2012" and subsequently clicks on two displayed document links, then the percentage for "fraction query one click" would be one half or 50%. Here, the feature value determination module 318 receives the "fraction query one click" feature data from the feature extraction module 316, performs a percentage computation, and provides the percentage to the NCM building module 320.

The "fraction query multiple clicks" feature defines the percentage of query sessions in which the user clicks on multiple document links displayed on the SERP. For example, with respect to FIG. 1, if the user 102 performs the search query "The Current USA Presidential Election" and clicks solely on the document link at the first position 114, and then performs a second search query "The Current USA Presidential Election 2012" and subsequently clicks on two displayed document links, then the percentage for "fraction query multiple clicks" would be one half or 50%. Here, the feature value determination module 318 receives the "fraction query multiple clicks" feature data from the feature extraction module 316, performs a percentage computation, and provides the percentage to the NCM building module 320.

The second class of features, context class features, specify the contextual information in which users (or client computing devices) make a click decision. Examples of context class features include, but are not limited to, the features provided in Table 2.

TABLE 2

Context Class

| Feature Name | Feature Description |
| --- | --- |
| Submit Time | The issued time of current query. |
| Query Subset Previous | True if current query is a subset of a previous query. |
| Query Superset Previous | True if current query is a superset of a previous query. |
| Query Distance Previous | Edit distance between current query and previous query. |
| Click In Last Session | True if there is a click in the previous session. |

TABLE 2-continued

Context Class

| Feature Name | Feature Description |
|---|---|
| Dwell Time In Last Session | The dwell time a user spends on previous session (in seconds). |
| First Query | True if the query is the first query in a search session. |
| Time In Search | Time spent on the search engine thus far (in seconds). |
| URL In Search | Number of URLs in the search session thus far. |
| Query In Session | Number of queries in the search session thus far. |
| Click In Session | Number of clicks in the current search session thus far. |
| Average Time Between Queries | Average interval time between two submitted queries. |
| Time To Last Action | Time to last action (e.g., a query submission or a click). |

The "submit time" feature is defined as the recorded time the search query is submitted to the search engine by the user. For example, the time may be recorded as 3:58:04 p.m. EST on Sep. 30, 2011. Here, the feature value determination module 318 receives the "submit time" feature data from the feature extraction module 316, and provides the recorded time to the NCM building module 320.

The "query subset previous" feature is defined as whether or not the current query is a subset of a previous query. For example, with respect to FIG. 1, if the user 102 submits the search query "The Current USA Presidential Election" and then submits a second search query "The Current USA Presidential Election 2012", then the second search query may be considered a subset of the first query since it includes an added term "2012". Here, the feature value determination module 318 receives the "query subset previous" feature data, with respect to the second query currently being analyzed, and provides a Boolean value, true or false, for the current query to the NCM building module 320.

The "query superset previous" feature is defined as whether or not the current query is a superset of a previous query. For example, with respect to FIG. 1, if the user 102 submits the search query "The Current USA Presidential Election", and then submits a second search query "Presidential Election," then the second search query may be considered a superset of the first search query. Here, the feature value determination module 318 receives the "query superset previous" feature data, with respect to the second query currently being analyzed, and provides a Boolean value, true or false, for the current query to the NCM building module 320.

The "query distance" feature is defined as the edit distance between a current query and a previous query. Given two different character strings, $string_1$ and $string_2$, the edit distance between $string_1$ and $string_2$ is the minimum number of edit operations required to transform $string_1$ into $string_2$. The edit operations may include the addition of a character or the deletion of a character. Thus, with respect to FIG. 1, if the user 102 performs the search query "The Current USA Presidential Election", and then performs a second search query "The Current USA Presidential Election 2012", then the "query distance" feature for second search query (e.g., the current query) is four, since the second query added "2012". Here, the feature value determination module 318 receives the "query distance" feature data, with respect to the second query currently being analyzed, and provides a real number value for the current query to the NCM building module 320.

The "click in last session" is defined as whether or not there was a click in a previous query session. For example, with respect to FIG. 1, if the user 102 performs the search query "The Current USA Presidential Election" and clicks on the document at the first position 114, and then performs a second search query "The Current USA Presidential Election 2012", then the "click in last session" feature would be true with respect to the second search query. Here, the feature value determination module 318 provides a Boolean value, true or false, for the current query to the NCM building module 320.

The "dwell time in last session" is defined as the amount of time a user spends on a previous query session. This amount of time includes the time the user spends examining document links on the SERP and the time the user spends examining the complete documents in an event the user clicks a document link displayed on the SERP. For example, with respect to FIG. 1, if the user 102 performs the search query "The Current USA Presidential Election", examines the SERP for fifteen seconds, clicks on the document at the first position 114, examines the first document for twenty seconds, and then performs a second search query "The Current USA Presidential Election 2012", then the "dwell time in last session" feature would be thirty-five seconds with respect to the second search query. Here, the feature value determination module 318 may receive timing information from the feature extraction module 316, perform computations, and provide a time (e.g., corresponding to the "last query session") for the current query session, in seconds, to the NCM building module 320.

The "first query" feature is defined as whether or not the current query session is the first query session in a search session. For example, with respect to FIG. 1, if the user 102 initially performs the search query "The Current USA Presidential Election" and then performs another search query "The Current USA Presidential Election 2012", then the "first query" is true for the initial query session and false for the second query session. Here, the feature value determination module 318 provides a Boolean value for the current query session to the NCM building module 320.

The "time in search" feature is defined as the time the user has spent on the search engine up to the point of a current document link click. Here, the feature value determination module 318 may receive timing information from the feature extraction module 316 relating to continuous search engine use, perform computations, and provide a time for the current click, in seconds, to the NCM building module 320.

The "URL in search" feature is defined as the number of URLs that have been displayed to the user in the search session up to the point of a current document link click. For example, with respect to FIG. 1, if the user 102 initially performs the search query "The Current USA Presidential Election", views twelve URLs on three different SERPs (i.e. by moving to a second and third SERP), and then performs a second search query "The Current USA Presidential Election 2012", and views another eight URLs on two different SERPs, then the "URL in search" would be twenty. Here, the feature value determination module 318 provides a real number for the current click to the NCM building module 320.

The "query in session" is defined as the number of submitted search queries within the search session up to the user click being analyzed. For example, with respect to FIG. 1, if the user 102 initially performs the search query "The Current USA Presidential Election" and then performs a second search query "The Current USA Presidential Election 2012", then the "query in session" would be two when the a click within the second query session is being analyzed. Here, the feature value determination module 318 provides a real number for the current click to the NCM building module 320.

The "click in session" feature is defined as the total number of user clicks realized in the search session up to the user click being analyzed. For example, with respect to FIG. 1, if the user 102 initially performs the search query "The Current USA Presidential Election" and clicks on two document links, and then performs a second search query "The Current USA Presidential Election 2012" and clicks on three document links, then the "click in session" would be five up to a subsequent current user click within the second query session being analyzed. Here, the feature value determination module 318 provides a real number for the current click to the NCM building module 320.

The "average time between queries" feature is defined as an average time between two submitted search queries. For example, with respect to FIG. 1, if the user 102 initially performs the search query "The Current USA Presidential Election" at time $t_1$, and then performs another search query "The Current USA Presidential Election 2012" at time $t_2$, the "average time between queries" would be $t_2-t_1$. These time intervals are averaged over each set of two consecutive search queries. Here, the feature value determination module 318 provides an average time, in seconds, to the NCM building module 320.

The "time to last action" feature is defined as the time to last action, such as a submission of a search query or a user click on a document link. For example, with respect to FIG. 1, if the user 102 performs the search query "The Current USA Presidential Election" at time $t_1$, and then clicks on the document at the first position 114 at time $t_2$, the "time to last action" would be $t_2-t_1$. Here, the feature value determination module 318 provides a time for each current action, in seconds, to the NCM building module 320.

The examples for extracting the respective features and providing the determined feature values to the NCM building module, as provided above, are used to understand the user class features and the context class features listed in Table 1 and Table 2, and are solely provided for illustrative purposes. However, it is understood in the context of this document that the feature value determination module 318 most likely will provide more granular data for the respective features based on a large-scale pool of search query data and click data maintained in the CTDLS. This may include numerous different search sessions (human labeled or unlabeled), numerous different query sessions, numerous different click actions, multiple different users (e.g., user IDs, device IDs, etc.), and the like.

As discussed above, the feature value determination module 318 converts, computes, and/or provides respective feature values to the NCM building module 320. The NCM building module 320 then uses the respective feature values and the human provided labels that rate each document-query pair as "relevant" or "irrelevant", to learn noise predictor parameters that characterize the degree of noise associated with a user click event. In other words, the NCM building module 320 establishes correlations between the determined feature values and the human provided relevance ratings. In various embodiments, the human labeling is performed randomly on a subset of search sessions maintained in the CTDLs in association with a commercial human relevance system (HRS).

When modeling user click data, click models generally make assumptions with respect to user clicks and user actions within a query session. For instance, user examination of a document link displayed on a SERP and a user click of the document link are considered separate events. Click models generally assume that a user is more likely to click a document if the user examines the document link (e.g., hyperlink or URL) and/or a displayed snippet. During a query session, a binary random variable $E_i=1$ indicates that a user examines the document link (FIG. 1 #122) and/or any associated snippet (FIG. 1 #124) of the document displayed at position i on the SERP. In contrast, $E_i=0$ indicates the user does not examine the document link at position i. Similarly, $C_i=1$ indicates that the user clicks on the document link at position i, and $C_i=0$ indicates that the user does not click on the document link. Accordingly, $P(E_i=1)$ indicates the examination probability for the document link at position i, and $P(C_i=1)$ indicates the click probability for the document link at position i.

The NCM building module 320 uses a symbol $L_i$ to represent a binary rating of "relevant" or "irrelevant" for a document link at position i. For instance, $L_i=1$ indicates that the document associated with the document link at position i is relevant, while $L_i=0$ indicates that the document is irrelevant. For the human labeled search sessions 326 in FIG. 3, $L_i$ is determined by the ratings provided by the human judges.

The NCM building module 320 introduces a symbol $N_i$ that characterizes the degree of noise associated with a context of a user click. The degree of noise is inversely situated to a value indicating a quality of a user click for inferring relevance. For instance, when $N_i=1$, an extremely noisy context, a user tends to click on an irrelevant document (i.e., not a quality click for inferring relevance), and when $N_i=0$, a noise-free context, a user tends to skip an irrelevant document and only click on relevant documents (i.e. a quality click for inferring relevance). Using these definitions, the NCM building module 320 establishes the following conditional probability equations as follows, $$P(N_i=1)=g(f_1,f_2,f_3,\ldots,f_n), \quad (1)$$

$$P(C_i=1|E_i=0)=0, \quad (2)$$

$$P(C_i=1|E_i=1,L_i=1,N_i=0)=r_{\Phi(i)}, \quad (3)$$

$$P(C_i=1|E_i=1,L_i=0,N_i=0)=0, \quad (4)$$

$$P(C_i=1|E_i=1,L_i=0,N_i=1)=b. \quad (5)$$

The variable $r_{\Phi(i)}$ in equation (3) indicates the click probability when a user in a noise-free context examines the document at position i with a relevant rating. The variable b is a query-dependent parameter and thus, each query has an individual b value. The query-dependent parameter b is a probability (e.g., likelihood) that an examined document will be clicked in a noisy environment. The $f_i$'s in equation (1) represent the respective user class features and context features provided to the NCM building module 320, and g: $R^n \rightarrow R$ is a function that maps the individual features to a probability value characterizing the degree of noise in which a user clicks occurs. In various embodiments, g may be defined as, $$g(f_i)=\Phi(\Sigma w_i f_i). \quad (6)$$

Here, $w_i$ is a weight for the respective features $f_i$. As discussed in further detail below, $w_i$ is a noise predictor parameter that the NCM building module 320 learns based on the human provided relevance ratings. $\Phi(x)$ is a cumulative distribution function of a standard normal distribution, defined as, $$\Phi(x)=\int_{-\infty}^{x} N(t;0,1)dt. \quad (7)$$

In various embodiments, the NCM building module 320 uses equation (7) to assure the probability value is within an interval of [0, 1].

In order to build the NCM, the training environment discussed with respect to FIG. 2 may be divided into two stages according to whether the feature extraction module 316 extracts feature data from i) search sessions in the human labeled subset, or ii) large-scale unlabeled search sessions maintained in the CTLDs. During the first stage, the NCM building module 320 uses the human provided ratings to learn noise predictor parameters for each of the respective features.

For example, for each of the human labeled search sessions 326 in FIG. 3, the NCM building module 320 receives feature values from the feature value determination module 318 and learns noise predictor parameters. The noise predictor parameters are feature weighting coefficients $w_i$ (i=1, 2, . . . , n) determined for each respective feature listed in Table 1 and Table 2. In various embodiments, the NCM building module 320 receives a feature vector f based on the individual features extracted for the human labeled search sessions, and outputs a noise probability $\Phi(w^T f)$. Here $w=(w_1, w_2, \ldots, w_n)$. In the first stage, the NCM building module 320 also estimates probability parameters, $\Theta=(\theta_1, \theta_2, \ldots, \theta_n)$. These probability parameters $\Theta$ include parameters associated with click model assumptions established in other click models 322. These probability parameters $\Theta$ also include an inferred relevance for each query-document pair. However, during the first stage the NCM building module 320 does not estimate the inferred relevance for each query-document pair because the human labels provide actual relevance ratings.

In order to learn the noise predictor parameters w and the probability parameters $\Theta$, the NCM building module 320 employs an approximate Bayesian inference. The NCM building module 320 incrementally learns the noise predictor parameters w and the probability parameters $\Theta$ by receiving and processing the determined features values from each of the human labeled search sessions 326, one by one. In various embodiments, the NCM building module 320 divides continuous features $f_i$ into different buckets so that continuous values can be mapped into a set of discrete/categorical values used for inference. For example, a range of continuous values between zero and one may be mapped into twenty-five different buckets, with the first bucket including values from 0 to 0.04, the second bucket containing values from 0.04 to 0.08 and so forth.

Accordingly, given a human labeled search session s, the NCM building module 320 updates the distribution of parameters w and $\Theta$ based on: i) the extracted feature data which has been converted to respective feature values for the NCM building module 320, and ii) the human provided ratings labeling a document as relevant or irrelevant. Before incrementally updating the distributions for each given search session s, w and $\Theta$ have prior distributions p(w) and p($\Theta$), respectively. The NCM building module 320 first computes likelihood functions P(s|$w_i$) and P(s|$\theta_j$), then multiplies each likelihood function to the prior distribution thereby deriving posterior distributions p($w_i$|s) and p($\theta_j$|s). The NCM building module 320 then uses the posterior distributions p($w_i$|s) and p($\theta_j$|s) as prior distributions for the next human labeled search session s+1.

In various embodiments, the NCM building module 320 employs a Probit Bayesian Inference (PBI) to incrementally update the distribution of the probability parameters $\theta_j$. However, since the noise predictor parameters, $w_i$, are real numbers instead of probabilities, $w_i$ is not compatible with the PBI's input format. Accordingly, the NCM building module 320 introduces an auxiliary variable $y=w^T f$ to incrementally update the distribution of $w_i$. Since, $\Phi(y)$ is a probability, the NCM building module 320 first applies a PBI to derive the posterior distribution p($\Phi(y)$|s), and then the NCM building module 320 calculates p(y|s). Accordingly, p(y|s) is a Gaussian density. Furthermore, p($w_i$|s) is the marginal of the joint distribution p(y, w|s) after integrating y and all other variables in w, denoted as $w^{\backslash i}$. Thus, the NCM building module 320 can calculate p($w_i$|s) as follows, $$p(w_i \mid s) \propto \int \left( \prod_{i=1}^{n} p(w_i) \right) p(y \mid w) p(s \mid y) dw^{\backslash i} dy, \quad (8)$$

$$p(s \mid y) \propto \frac{p(y \mid s)}{p(y)} = \frac{p(y \mid s)}{\int \left( \prod_{i=1}^{n} p(w_i) \right) p(y \mid w) dw}. \quad (9)$$

Once the feature data and relevance rating for each human labeled search session s is loaded and processed, the NCM building module 320 completes the learning of the noise predictor parameters because a distribution for each $w_i$ has been established. The inference procedure ensures that distributions are Gaussian. Thus, $$P(w_i) = N(w_i; \mu_i, \sigma_i^2). \quad (10)$$

Accordingly, given an arbitrary feature vector f from the functionality performed by the feature extraction module 316 and the feature value determination module 318, the NCM building module 320 predicts the probability of noise by the expectation of $\Phi(w^T f)$ as follows, $$P(N=1) = E(\Phi(w^T f)) = \Phi \left( \frac{\sum_{i=1}^{n} \mu_i f_i}{\sqrt{1 + \sum_{i=1}^{n} \sigma_i^2 f_i^2}} \right). \quad (11)$$

During the second stage of the training environment in FIG. 2, the NCM building module 320 uses unlabeled search sessions to improve and further estimate the probability parameters $\Theta$. In contrast to the first stage, in the second stage the NCM building module 320 also estimates, or infers, the relevance of a query-document pair, since the relevance ratings have not been provided by human judges. As previously discussed, this is a computer automated process intended to provide an equivalent to the relevance ratings issued by human judges, since relying on human judges to parse through large-scale CTLDs and rate all the query-document pairs is impractical.

Accordingly, in the second stage, the NCM building module 320 defines a noise-aware click probability as follows, $$P(C_i=1 \mid E_i=0) = 0, \quad (12)$$

$$P(C_i=1 \mid E_i=1) = P(N_i=0) r_{\Phi(i)} + P(N_i=1) b, \quad (13)$$

Here, $P(N_i=0)=1-P(N_i=1)$ is given by the noise predictor parameters learned in the first stage, as provided in equation (11). As previously mentioned, $r_{\Phi(i)}$ indicates a click probability (e.g., click-through rate metric) when a user examines a relevant document d at position i in a noise-free context. Therefore, the NCM building module 320 uses $r_{\Phi(i)}$ in equation (13) to estimate, or infer, the relevance of a document d at position i. A search engine module 314 may then use the NCM to more accurately predict the likelihood or probability of future click events.

During the document relevance inference in the second stage, the NCM building module 320 employs the PBI to perform parameter estimation for the probability parameters $\Theta$. In the second stage, $w_i$ are constant weighting coefficient values (i.e., the noise predictor parameters) learned for each feature in the first stage. In the second stage, the NCM building module 320 again processes each unlabeled search session s, and derives a probability distribution for each probability parameter. In various embodiments, the variance of the probability distribution for each probability parameter converges to zero, such that a numerical estimation results. When the variance of the probability distribution for a probability parameter does not converge to zero, the NCM building module 320 may compute an expectation of the probability parameter to achieve a numerical estimation.

Thus, using the NCM generated by the NCM building module 320, a search engine module 314 can compute a probability of a click event for a given query-document pair, and more accurately predict user clicks in future search sessions. For instance, given a search query and a SERP, the probability distribution of a user click event of a document link at position i on the SERP can be calculated as follows, $$P(C_i=1)=P(E_i=1)((1-\Phi(\Sigma w_i f_i)r_{\Phi(i)}+\Phi(\Sigma w_i f_i)b). \quad (14)$$

Illustrative Processes

Figure 4:
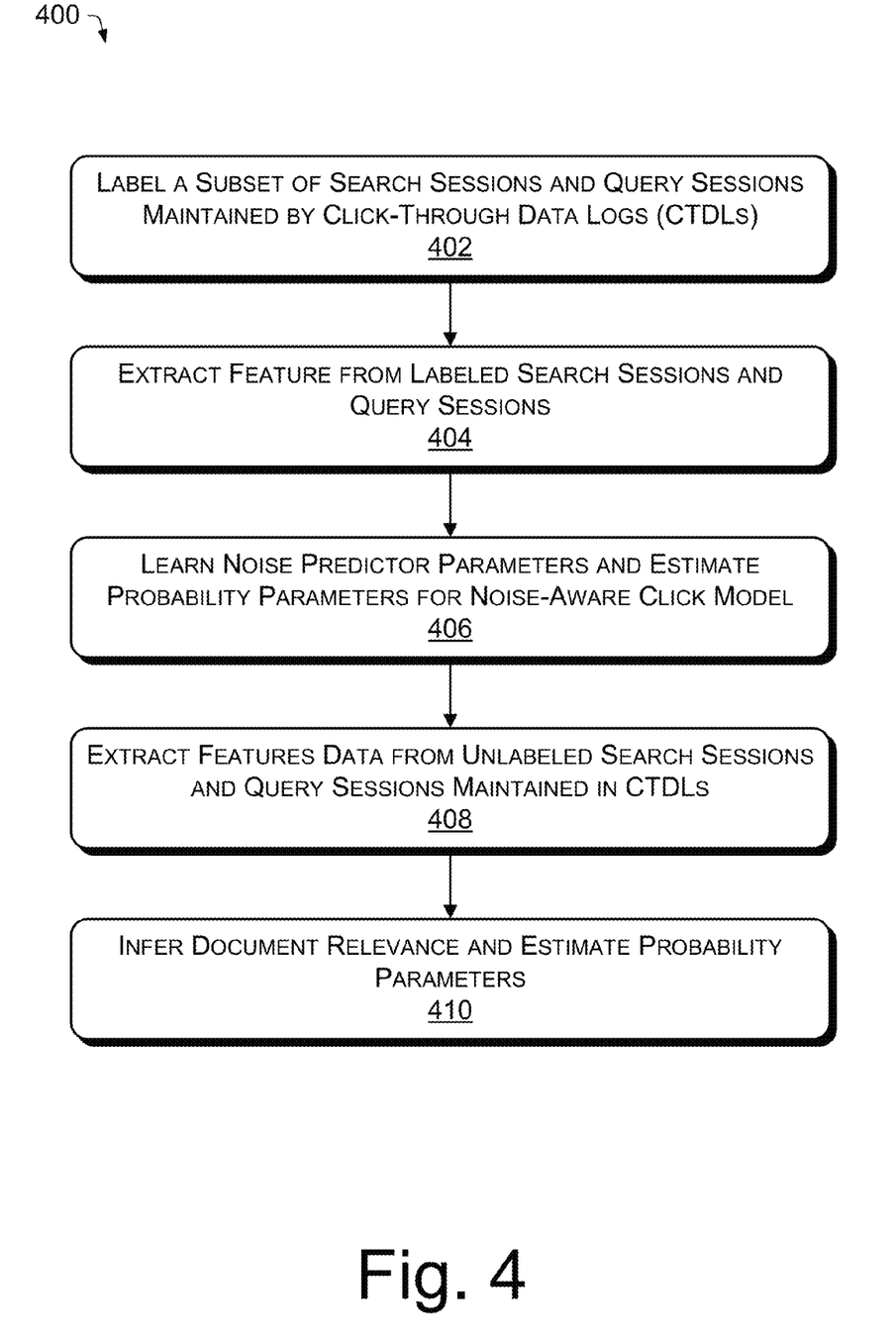
FIG. 4 illustrates an example process that builds a Noise-Aware Click Model, in accordance with various embodiments.
Figure 5:
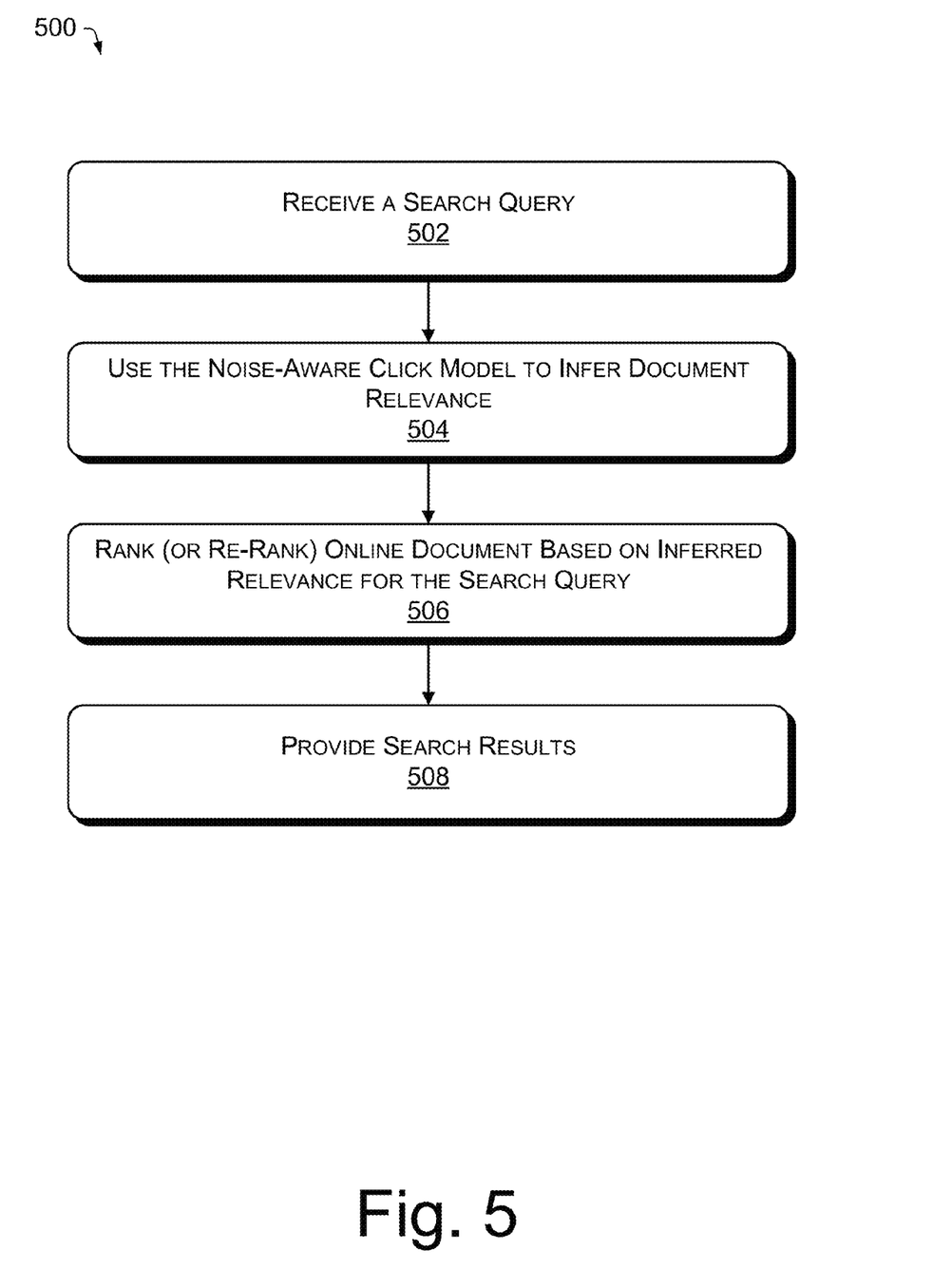
FIG. 5 illustrates an example process that uses a Noise-Aware Click Model, in accordance with various embodiments.

Example operations are described herein with reference to FIG. 4 and FIG. 5. The processes are illustrated as logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates an example process 400 that trains the NCM. At operation 402, human judges label a subset of search sessions and query sessions maintained by CTLDs. The labeling includes rating each query-document pair in the subset as a "relevant" or "irrelevant" relationship. In various embodiments, the human ratings may be provided by multiple judges (e.g., two, five, one hundred, one thousand, etc.) and the ratings may be averaged since judges may provide different subjective labels to the same query-document pair. Moreover, multiple different labeling schemes may be contemplated and realized to rate each query-document pair. In one example, the multiple judges may rate the query-document pair as "relevant" or "irrelevant", as previously discussed. In another example, the multiple judges may be able to provide a label to a query-document pair by scoring the query-document pair according to a scale (e.g., one to five). Here, a score of one may indicate a "bad" query-document pair relationship, a score of two may indicate a "fair" query-document pair relationship, a score of three may indicate a "good" query-document pair relationship, a score of four may indicate an "excellent" query-document pair relationship, and a score of five may indicate a "perfect" query-document pair relationship. In various embodiments, these scores may be averaged across the multiple judges and then each document may be labeled as "relevant" or "irrelevant" based on a set threshold (e.g., 2.0 or 2.5) that divides the scoring spectrum into two buckets, relevant or irrelevant.

At operation 404, the feature extraction module 316 processes the human labeled search sessions, one by one, and extracts feature data from the respective human labeled search sessions and query sessions. The extracted feature data corresponds to each of the features listed in Table 1 and Table 2. In various embodiments, the feature extraction module may focus on a pre-selected set of features listed in Tables 1 and 2 (e.g. a pre-selected set of eight features).

At operation 406, the NCM building module 320 learns noise predictor parameters w based on the human provided ratings and the extracted feature data. The NCM building module 310 also estimates probability parameters $\Theta$ based on the human provided ratings and the extracted feature data. The noise predictor parameters are the weighting coefficients $w_i$ determined for each extracted feature, as discussed above.

At operation 408, the feature extraction module 316 extracts feature data from the search sessions maintained in the CTLDs that have not been labeled by human judges.

At operation 410, the NCM building module 320 infers document relevance and continues to estimate probability parameters $\Theta$ using the extracted feature data from the unlabeled search sessions and the noise predictor parameters w learned using the labeled search sessions. As previously discussed, the NCM building module 320 infers user perceived relevance of each user click in an unlabeled search session based on a degree of noise associated with each user click. This inferred relevance determined by the NCM provides an equivalent to the human provided relevance ratings.

In various embodiments, a search engine module 314 will repeat operation 410 periodically. For instance, the search engine module 314 may train the NCM every day, week, month, etc., so that any new unlabeled search sessions conducted by users 102 and maintained in the CTLDs, are considered.

FIG. 5 illustrates an example process 500 that applies the trained NCM generated according to FIG. 4. At operation 502, a search engine module 314 receives a user submitted search query.

At operation 504, the search engine module 314 employs the NCM to infer document relevance, as previously discussed. At operation 506, the search engine module 314 ranks (or re-ranks) online documents to be provided to a user via a SERP. The search engine is able to rank online documents, or improve an already ranked list of online documents, because the NCM includes parameters that consider the context in which user clicks occur by characterizing a degree of noise associated with a click. Therefore, the NCM is able to account for user perceived relevance, which provides a good indication of a quality of a user click compared to the unreliable, and easily observable, binary event click data. In various embodiments, the search engine module 314 may perform the functionality depicted at operations 504 and 506 prior to receiving a user submitted search query depicted at operation 502.

At operation 508, the search engine module 314 provides the SERP to the user and/or the client computer.

Incorporating the NCM into Click Models

In various embodiments, the NCM can be used to embrace and complement assumptions in other click models 322 because the NCM is a general model. For example, the search engine module 314, at operation 504, may rank online documents using one or more other click models 322 that incorporate the NCM.

For example, a user browsing model (UBM) assumes that the examination event $E_i$ depends on the position i of a document link, and also on a preceding clicked position $l_i$ of another document link in the same query session, as follows, $$l_i = \max\{j \in \{1, \ldots i-1\} | C_j = 1\}. \quad (15)$$

Here, $l_i$ introduces a series of global parameters $\beta_{l_i,i}$ that measure a transition probability from position $l_i$ to position i. The UBM is characterized by the following, $$P(E_i=1|C_{1:i-1}=0)=\beta_{0,i}, \quad (16)$$

$$P(E_i=1|C_{l_i}1, C_{l_i+1:i-1}=0)=l_{l_i,i}, \quad (17)$$

$$P(C_i=1|E_i=0)=0, \quad (18)$$

$$P(C_i=1|E_i=1)=a_{\Phi(i)}. \quad (19)$$

When $l_i=0$, there are not preceding clicks. The term $C_{i:j}=0$ is an abbreviation for $C_i=C_{i+1}=\ldots=C_j=0$.

A noise-aware UBM (N-UBM) introduces the variable $N_i$ to characterize the degree of noise associated with a user click as follows, $$P(E_i=1|C_{1:i-1}=0)=\beta_{0,i}, \quad (20)$$

$$P(E_i=1|C_{l_i}=1,C_{l_i+1:i-1}=0)=\beta_{l_i,i}, \quad (21)$$

$$P(N_i=1)=\Phi(\Sigma w_i f_i), \quad (22)$$

$$P(C_i=1|E_i=0)=0, \quad (23)$$

$$P(C_i=1|E_i=1,L_i=1,N_i=0)=r_{\Phi(i)}, \quad (24)$$

$$P(C_i=1|E_i=1,L_i=0,N_i=0)=0, \quad (25)$$

$$P(C_i=1|E_i=1,N_i=1)=b. \quad (26)$$

When calculating $P(E_i=1)$, the N-UBM considers whether there are preceding clicks. When a preceding click exists, the N-UBM enumerates a last click position j above a document link position i. The N-UBM then calculates $P(E_i=1)$ as follows, $$P(E_i=1)=P(C_{1:i-1}=0)\beta_{0,i}+\Sigma_{j=1}^{i-1}P(C_j=1)P(C_{(j+1):(i-1)}=0)\beta_{j,i}, \quad (27)$$

The N-UBM results when a search engine module 314 uses equation (27) in association with equation (14) to predict a user click event.

In another example, a Dynamic Bayesian Network (DBN) model assumes that a click does not always indicate a user's satisfaction with the document. Instead, the user may be attracted to the document by misleading snippets of information displayed on the SERP, as previously discussed. Therefore, the DBN model distinguishes document relevance as perceived relevance $a_i$ and actual relevance $s_i$. If the user is satisfied with the clicked document, the DBN model assumes the user will not subsequently examine or click on another document. Accordingly, there is a probability $1-\gamma$ that the user abandons her query session and a probability $\gamma$ that the user continues a search. Thus, the DBN model is defined as, $$P(S_i=1|C_i=0)=0, \quad (28)$$

$$P(S_i=1|C_i=1)=s_{\Phi(i)}, \quad (29)$$

$$P(E_{i+1}=1|S_i=1)=0, \quad (30)$$

$$P(E_{i+1}=1|E_i=1,S_i=0)=\gamma. \quad (31)$$

Here, $S_i$ is a hidden event indicating whether a user is satisfied with a document at position i.

A noise-aware DBN (N-DBN) model also introduces the variable $N_i$ to characterize the degree of noise associated with a user click as follows, $$P(E_i=1)=1, \quad (32)$$

$$P(C_i=1|E_i=0)=0, \quad (33)$$

$$P(N_i=1)=\Phi(\Sigma w_i f_i), \quad (34)$$

$$P(C_i=1|E_i=1,L_i=1,N_i=0)=r_{\Phi(i)}, \quad (35)$$

$$P(C_i=1|E_i=1,L_i=0,N_i=0)=0, \quad (36)$$

$$P(C_i=1|E_i=1,N_i=1)=b, \quad (37)$$

$$P(S_i=1|C_i=0)=0, \quad (38)$$

$$P(S_i=1|C_i=1)=s_{\Phi(i)}, \quad (39)$$

$$P(E_{i+1}=1|E_i=0)=0, \quad (40)$$

$$P(E_{i+1}=1|S_i=1)=0, \quad (41)$$

$$P(E_{i+1}=1|E_i=1,S_i=0)=\gamma. \quad (42)$$

The N-DBN model calculates $P(E_i=1)$ as follows, $$P(E_i=1)=1, \quad (43)$$

$$P(E_{i+1}=1)=(1-P(C_i=1)s_{\Phi(i)})\gamma. \quad (44)$$

The N-DBN model results when a search engine module 314 uses equation (43) and equation (44) in association with equation (14) to predict a user click event.

CONCLUSION

Although the subject matter has been described in language specific to structural features and/or methodological acts, it is to be understood that the subject matter defined in the appended claims is not necessarily limited to the specific features or operations described above. Rather, the specific features and operations described above are described as examples for implementing the claims.

The invention claimed is:

1. A method comprising:
   under control of a processor configured with computer-executable instructions,
   receiving, for each of a plurality of query-document pairs identified from one or more search sessions, one or more labels indicating that each query-document pair is relevant or irrelevant;
   extracting feature data for each labeled query-document pair;
   generating, based at least in part on the feature data, a model that characterizes a context in which a user decides to click on an irrelevant document; and
   using the model to determine that an individual click event of a plurality of individual click events associated with a search query is associated with the irrelevant document.

2. The method recited in claim 1, wherein the feature data includes one or more user class features that characterize a behavior of the user when the user performs online searches.

3. The method recited in claim 2, wherein the user corresponds to a device identifier.

4. The method recited in claim 2, wherein the one or more user class features are selected from a group comprising:
   a dwell time feature indicating an average amount of time that passes between two consecutive user actions;
   an interval time feature indicating an average amount of time between two consecutive document link selections for the user;
   a user skip feature indicating whether the user skipped a document link displayed on a search engine result page (SERP);
   a user click feature indicating whether the user selected a document link displayed on a SERP;
   a user first click feature indicating whether a document was the first document selected by the user within a query session;
   a user last click feature indicating whether a document was the last document selected by the user within a query session;

a user only click feature indicating whether a document was the only document selected by the user within a query session;

a fraction query no click feature indicating a percentage of query sessions in which the user does not select any document links displayed on a SERP;

a fraction query one click feature indicating a percentage of query sessions in which the user selects only one document link displayed on a SERP; and a fraction query multi-clicks feature indicating a percentage of query sessions in which the user selects multiple document links displayed on a SERP.

5. The method recited in claim 1, wherein the feature data includes one or more context class features that specify the context in which the user makes a click decision when the user performs an online search.

6. The method recited in claim 5, wherein the one or more context class features are selected from a group comprising:

a submit time feature indicating a recorded time the user submits a search query to a search engine;

a query subset previous feature indicating whether a current query is a subset of a previous query;

a query superset previous feature indicating whether a current query is a superset of a previous query;

a query distance previous feature indicating an edit distance between a current query and a previous query;

a click in last session feature indicating whether there was a selection in a previous query session;

a dwell time in last session feature indicating an amount of time the user spends on a previous query session;

a first query feature indicating whether a current query session is a first query session in a search session;

a time in search feature indicating a time the user has spent on a search engine up to a current document link selection;

a Uniform Resource Locator (URL) in search feature indicating a number of URLs that have been displayed to the user in a search session up to a current document link selection;

a query in session feature indicating a number of submitted search queries within a search session up to a current document link selection;

a click in session feature indicating a total number of user clicks realized in a search session up to a current document link selection;

an average time between queries feature indicating an average time between two submitted search queries; and a time to last action feature indicating an amount of time that has passed since a previous action occurred.

7. The method recited in claim 1, wherein receiving the one or more labels comprises receiving one or more human ratings indicating each query-document pair as relevant or irrelevant.

8. The method recited in claim 1, wherein generating the model comprises learning one or more noise predictor parameters, the one or more noise predictor parameters being based at least in part on a history of click behavior specific to the user.

9. The method recited in claim 8, wherein learning the one or more noise predictor parameters includes determining distributions of one or more weight parameters corresponding, respectively, to one or more extracted features.

10. The method recited in claim 1, wherein the search query is a first search query, and the method further comprises:

modifying the model, based at least in part on additional extracted feature data associated with click events of the first search query; and generating, using the model as modified, a probability of a subsequent click event for a given query-document pair associated with a second search query.

11. The method recited in claim 10, wherein the probability of the subsequent click event for the given query-document pair is generated based at least in part on search behavior specific to the user.

12. The method recited in claim 10, further comprising:

ranking a plurality of documents associated with the second search query based at least in part on the generated probability; and providing search results, comprising at least a portion of the plurality of documents, according to the ranking.

13. The method recited in claim 10, further comprising:

incorporating the model into a Dynamic Bayesian Network (DBN) model;

ranking the plurality of documents based at least in part on the DBN model; and providing search results, comprising at least a portion of the plurality of documents, according to the ranking.

14. The method recited in claim 10, further comprising:

incorporating the model into a user browsing model (UBM);

ranking the plurality of documents based at least in part on the UBM; and providing search results, comprising at least a portion of the plurality of documents, according to the ranking.

15. One or more computer-readable storage media comprising computer-executable instructions that, when executed on one or more processors, configure the one or more processors to perform operations comprising:

building a noise-aware click model based at least in part on: (i) human provided relevance ratings for each of a plurality of query-document pairs in a first group of one or more search sessions, and (ii) a first set of features associated with the first group of one or more search sessions;

employing the noise-aware click model to characterize a context in which a user decides to click on an irrelevant document within a second group of one or more search sessions; and modifying the noise-aware click model based at least in part on extracted feature data associated with the second group of one or more search sessions and the context in which the user decides to click on the irrelevant document.

16. The one or more computer-readable storage media recited in claim 15, wherein the operations further comprise:

receiving a search query; and generating, using the noise-aware click model as modified, a probability of a click event for a given query-document pair associated with the search query.

17. The one or more computer-readable storage media recited in claim 15, wherein the characterization of the context in which the user decides to click on the irrelevant document is based at least in part on search behavior of the user.

18. A system comprising:

one or more processors;

one or more computer memories, coupled to the one or more processors and storing:

a feature extraction module, operable by the one or more processors, to extract data corresponding to multiple features from one or more labeled query-document pairs;

a feature value determination module, operable by the one or more processors, to receive the data from the feature extraction module and determine values for each of the multiple features;

a noise-aware click model building module, operable by the one or more processors, to:
  receive the determined values from the feature value determination module; and
  generate a noise-aware click model that characterizes, based at least in part upon the determined values, a context in which a user decides to click on an irrelevant document; and a search engine module, operable by the one or more processors, to use the noise-aware click model to infer document relevance for a plurality of search sessions maintained in click-through data logs.

19. The system as recited in claim 18, wherein the multiple features provide the context in which an online document selection occurs.

20. The system as recited in claim 18, wherein the multiple features provide historical user selection behavior.

\* \* \* \* \*